United States Patent
Ise et al.

(10) Patent No.: US 11,165,075 B2
(45) Date of Patent: Nov. 2, 2021

(54) FUEL CELL SYSTEM

(71) Applicant: Panasonic Intellectual Property Management Co., Ltd., Osaka (JP)

(72) Inventors: Takehiko Ise, Osaka (JP); Junji Morita, Kyoto (JP); Yoshito Usuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 16/161,057

(22) Filed: Oct. 16, 2018

(65) Prior Publication Data

US 2019/0173112 A1 Jun. 6, 2019

(30) Foreign Application Priority Data

Dec. 1, 2017 (JP) .............................. JP2017-232114

(51) Int. Cl.
*H01M 8/04089* (2016.01)
*H01M 8/04119* (2016.01)
(Continued)

(52) U.S. Cl.
CPC ... *H01M 8/04097* (2013.01); *H01M 8/04156* (2013.01); *H01M 8/04753* (2013.01);
(Continued)

(58) Field of Classification Search
CPC ......... H01M 8/04089; H01M 8/04097; H01M 8/04746; H01M 8/04753; H01M 8/04119;
(Continued)

(56) References Cited

U.S. PATENT DOCUMENTS

2003/0148167 A1 8/2003 Sugawara et al.
2003/0211374 A1 11/2003 Dehne
(Continued)

FOREIGN PATENT DOCUMENTS

| DE | 10251878 A1 | 7/2003 |
|----|----|----|
| JP | 2007-052948 | 3/2007 |
| JP | 2013-038086 A | 2/2013 |

OTHER PUBLICATIONS

The Extended European Search Report dated Jan. 2, 2019 for the related European Patent Application No. 18202279.8.
(Continued)

*Primary Examiner* — Karie O'Neill Apicella
(74) *Attorney, Agent, or Firm* — McDermott Will and Emery LLP (57) ABSTRACT

A fuel cell system includes a polymer electrolyte fuel cell that generates electric power using fuel gas and oxidant gas, a fuel gas supply path through which the fuel gas is supplied to an anode inlet of the fuel cell, a recycle gas path through which anode off-gas discharged from an anode outlet of the fuel cell returns to the fuel gas supply path, a pressure booster that is arranged in the fuel gas supply path between a confluence portion and the anode inlet, the fuel gas supply path and the recycle gas path meeting each other in the confluence portion, and a discharge path through which an impurity mixed into the anode off-gas is discharged outside.

11 Claims, 6 Drawing Sheets

(51) Int. Cl.
    *H01M 8/04746*    (2016.01)
    *H01M 8/0662*     (2016.01)
    *H01M 8/1018*     (2016.01)

(52) U.S. Cl.
    CPC ....... *H01M 8/0662* (2013.01); *H01M 8/0687* (2013.01); *H01M 2008/1095* (2013.01); *H01M 2300/0082* (2013.01)

(58) Field of Classification Search
    CPC ......... H01M 8/04156; H01M 8/04141; H01M 8/04164; H01M 8/0656; H01M 8/0612; H01M 8/0618; H01M 8/0438
    See application file for complete search history.

(56) References Cited

U.S. PATENT DOCUMENTS

| | | | |
|---|---|---|---|
| 2005/0214601 A1* | 9/2005 | Shimizu ............ | H01M 8/04194 429/429 |
| 2007/0087234 A1* | 4/2007 | Wang ................ | H01M 8/04201 429/413 |
| 2009/0280371 A1* | 11/2009 | Katano ............. | H01M 8/04089 429/421 |
| 2014/0212780 A1* | 7/2014 | Furusawa ......... | H01M 8/04753 429/429 |
| 2018/0048003 A1* | 2/2018 | Ikeda ...................... | H01M 8/04 |

OTHER PUBLICATIONS

Communication pursuant to Article 94(3) EPC dated Sep. 28, 2020 for the related European Patent Application No. 18202279.8.

\* cited by examiner

FUEL CELL SYSTEM

BACKGROUND

1. Technical Field

The present disclosure relates to fuel cell systems.

2. Description of the Related Art

A configuration of a fuel cell system has been proposed, where fuel gas (anode off-gas) not used in electric power generation of the fuel cell is reused (recycled) by being returned to the anode of the fuel cell (see for example, Japanese Unexamined Patent Application Publication No. 2007-52948). This configuration increases the efficiency of the electric power generation in the fuel cell system, compared to a configuration where anode off-gas is not recycled.

According to Japanese Unexamined Patent Application Publication No. 2007-52948, in a recycle gas path for returning anode off-gas discharged from the anode of the fuel cell to the fuel cell, a circulator (pressure booster) that forcibly conveys the anode off-gas to the anode of the fuel cell and a gas liquid separator that separates moisture in the anode off-gas from the anode off-gas are arranged.

SUMMARY

In the conventional example, however, problems regarding condensation of water vapor caused in the circulator (pressure booster) are not sufficiently reviewed.

One non-limiting and exemplary embodiment has been made in view of such circumstances and provides a fuel cell system that can reduce condensation of water vapor caused in a pressure booster more than conventional systems.

In one general aspect, to address the aforementioned problems, the techniques disclosed here feature a fuel cell system including a polymer electrolyte fuel cell that generates electric power using fuel gas and oxidant gas, a fuel gas supply path through which the fuel gas is supplied to an anode inlet of the fuel cell, a recycle gas path through which anode off-gas discharged from an anode outlet of the fuel cell returns to the fuel gas supply path, a pressure booster that is arranged in the fuel gas supply path between a confluence portion and the anode inlet, the fuel gas supply path and the recycle gas path meeting each other in the confluence portion, and a discharge path through which an impurity mixed into the anode off-gas is discharged outside.

A fuel cell system according to an aspect of the present disclosure is advantageous in that condensation of water vapor caused in a pressure booster can be reduced more than in conventional systems.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Careful review of problems regarding condensation of water vapor caused in a pressure booster has brought findings described below.

Since the amount of saturated water vapor contained in a certain volume depends on temperature and is irrelevant to pressure, and the amount of water vapor contained per unit volume of anode off-gas increases as the pressure rises in cases where the temperature is constant, the water vapor in the anode off-gas can possibly condense into water when a pressure booster pressurizes the anode off-gas.

In Japanese Unexamined Patent Application Publication No. 2007-52948, anode off-gas with high humidity flows into the pressure booster while maintaining the humidity. Accordingly, the pressurization on the anode off-gas causes condensed water and the condensed water accumulates in the pressure booster. Then, it raises a possibility of the flow rate of the anode off-gas becoming unstable because of water clogging caused in a channel of the pressure booster by the condensed water or a possibility of the condensed water making the pressure booster decrease its performance or go out of order.

Thus, a fuel cell system according to a first aspect of the present disclosure has been conceived on the basis of such findings and includes a polymer electrolyte fuel cell that generates electric power using fuel gas and oxidant gas, a fuel gas supply path through which the fuel gas is supplied to an anode inlet of the fuel cell, a recycle gas path through which anode off-gas discharged from an anode outlet of the fuel cell returns to the fuel gas supply path, a pressure booster that is arranged in the fuel gas supply path between a confluence portion and the anode inlet, the fuel gas supply path and the recycle gas path meeting each other in the confluence portion, and a discharge path through which an impurity mixed into the anode off-gas is discharged outside.

Such a configuration enables the fuel cell system according to the present aspect to reduce condensation of water vapor caused in the pressure booster more than conventional systems. Specifically, in the configuration, the pressure booster is arranged in the fuel gas supply path between the confluence portion and the anode inlet and fuel gas with low humidity and anode off-gas with high humidity before flowing into the pressure booster are mixed in the confluence portion. Such a configuration can lower the humidity of the mixed gas that flows into the pressure booster. Accordingly, even when the mixed gas is pressurized in the pressure booster, condensation of water vapor in the pressure booster can be reduced. As a result, possibilities of the flow rate of the mixed gas becoming unstable because of water clogging caused in the pressure booster by the condensed water can be reduced. Although the pressure booster can possibly decrease its performance or go out of order when condensed water develops corrosion or contamination of the pressure booster, the fuel cell system according to the present aspect can reduce such possibilities.

Further, in the fuel cell system according to the present aspect, impurities mixed into the anode off-gas can be discharged outside by opening a purging valve arranged in the discharge path at an appropriate time. Accordingly, the concentration of hydrogen in the anode off-gas can be suitably restored.

A fuel cell system according to a second aspect of the present disclosure, which is based on the fuel cell system according to the first aspect, may further include a flow rate regulator that is arranged in the recycle gas path and regulates the flow rate of the anode off-gas.

Such a configuration can cause resistance to flow of the fuel gas directed from the confluence portion to the anode outlet of the fuel cell and thus, such flow of the fuel gas can be suitably regulated. As a result, the fuel gas can be conveyed smoothly from the confluence portion to the pressure booster.

In a fuel cell system according to a third aspect of the present disclosure, which is based on the fuel cell system according to the first aspect or the second aspect, the pressure booster may be arranged above the confluence portion.

Such a configuration enables the fuel gas supply path from the confluence portion to the gas inlet of the pressure booster to extend with an ascending gradient. Accordingly, even when water vapor in the anode off-gas condenses into water, flowing of the condensed water into the gas inlet of the pressure booster can be inhibited.

A fuel cell system according to a fourth aspect of the present disclosure, which is based on the fuel cell system according to any one of the first aspect to the third aspect, may include a gas liquid separator that is connected to the recycle gas path or to the fuel gas supply path further downstream than the confluence portion.

Such a configuration enables condensed water caused by decrease in the temperature of the anode off-gas with high humidity to be suitably treated in the gas liquid separator.

Embodiments of the present disclosure are described below by referring to the accompanying drawings. The embodiments described below present examples of the above-described aspects. Thus, the shapes, materials, constituents, arrangement positions and connection forms of the constituents, and the like that are mentioned below are mere examples and are not intended to limit the above-described aspects unless otherwise recited in the claims. Among the constituents mentioned below, the constituents that are not recited in the independent claim indicating the most superordinate concept of the present aspects can be explained as given constituents. In the drawings, descriptions of the constituents that have identical references may be omitted. While the drawings schematically illustrate each constituent so as to facilitate understanding, the shapes, dimensional ratios, and the like therein may be indicated inaccurately.

First Embodiment

Figure 1:
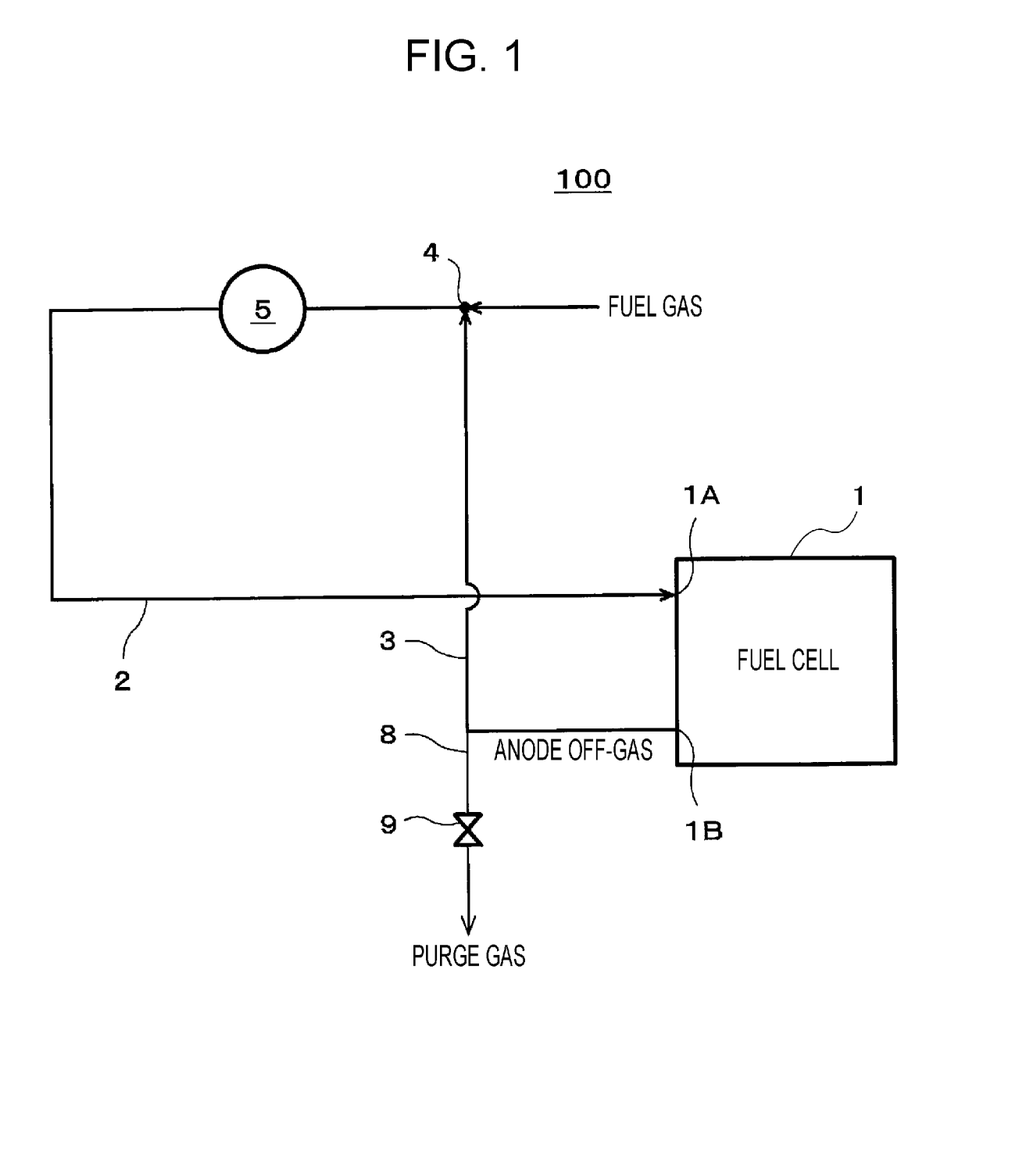
FIG. 1 illustrates an example of a fuel cell system according to a first embodiment.

FIG. 1 illustrates an example of a fuel cell system 100 according to a first embodiment.

In the example illustrated in FIG. 1, the fuel cell system 100 includes a fuel cell 1, a fuel gas supply path 2, a recycle gas path 3, a pressure booster 5, a discharge path 8, and a purging valve 9.

The fuel cell 1 generates electric power using fuel gas and oxidant gas. The fuel cell 1 may be any kind. Although a polymer electrolyte fuel cell (PEFC) is described as an example of the fuel cell 1 in the fuel cell system 100 according to the present embodiment, the fuel cell 1 is not limited to a PEFC. Other examples can include a solid oxide fuel cell (SOFC).

The fuel gas supply path 2 is a channel for supplying fuel gas to an anode inlet 1A of the fuel cell 1. That is, a downstream end of the fuel gas supply path 2 is connected to the anode inlet 1A of the fuel cell 1 and an upstream end of the fuel gas supply path 2 is connected to a supply source of the fuel gas, which is not illustrated. The supply source of the fuel gas has predetermined supply source pressure and examples of the supply source can include a fuel gas infrastructure and a fuel gas cylinder. Examples of the fuel gas can include hydrogen gas. In this case, the anode off-gas is off-hydrogen-gas not used in the fuel cell 1.

The recycle gas path 3 is a channel for returning the anode off-gas discharged from an anode outlet 1B of the fuel cell 1 to the fuel gas supply path 2. That is, an upstream end of the recycle gas path 3 is connected to the anode outlet 1B of the fuel cell and a downstream end of the recycle gas path 3 is connected to the fuel gas supply path 2.

The pressure booster 5 is arranged in the fuel gas supply path 2 downstream of a confluence portion 4, where the fuel gas supply path 2 and the recycle gas path 3 meet each other, in the direction in which the fuel gas flows. In other words, the pressure booster 5 is arranged in the fuel gas supply path 2 between the confluence portion 4 and the anode inlet 1A. The pressure booster 5 is a device that forcibly conveys mixed gas that contains the anode off-gas and the fuel gas flowing in the fuel gas supply path 2. The pressure booster 5 may have any configuration only when the configuration enables the pressure booster 5 to forcibly convey the mixed gas. Examples of the pressure booster 5 can include a diaphragm pump, a rotating pump, and a reciprocating pump.

The confluence portion 4 includes a channel through which the anode off-gas, the fuel gas, and the mixed gas flow. Examples of a channel member that constitutes the channel can include a T-shaped joint.

The discharge path 8 is a path for discharging impurities mixed into the anode off-gas outside. For the discharge path 8, a pipe of a material with incombustibility, such as a metal pipe like a stainless pipe, is typically used because the gas that flows through the discharge path 8 is combustible. However, the discharge path 8 is not limited to this pipe.

In the electric power generation of the fuel cell 1, the anode off-gas circulates to return from the anode outlet 1B to the anode inlet 1A of the fuel cell 1 until being used for the electric power generation of the fuel cell 1.

Thus, the fuel cell system 100 according to the present embodiment includes the discharge path 8, which branches from the circulation path and communicates with the air, and the purging valve 9, which is arranged in the discharge path 8. Although a solenoid valve may be used as the purging valve 9 for example, the purging valve 9 is not limited to a solenoid valve.

With such a configuration, the concentration of impurities mixed into the anode off-gas can be decreased. Accordingly, the concentration of hydrogen in the anode off-gas can be suitably restored. Specifically, while the purging valve 9 is closed, the anode off-gas circulates to return from the anode outlet 1B to the anode inlet 1A of the fuel cell 1 until being used for the electric power generation of the fuel cell 1. Then, in the course of the anode off-gas circulating through the circulation path, impurities except the fuel gas, which is hydrogen gas for example, increase in the anode off-gas over time. For example, air flows to the cathode of the fuel cell 1 and thus, examples of the impurity can include nitrogen gas that escapes from the cathode to the anode through an electrolyte film. Since the concentration of the hydrogen in the anode off-gas decreases as the impurities mixed into the anode off-gas increase, during the electric power generation of the fuel cell 1, purge gas that contains the impurities is released (purged) from the circulation path to the air by temporarily opening the purging valve 9 at an appropriate time.

A downstream end of the discharge path 8 is opened to the air. An upstream end of the discharge path 8 may be connected to any portion only when the portion is in the circulation path in which the anode off-gas circulates.

For example, the upstream end of the discharge path 8 may be connected to the recycle gas path 3. Accordingly, the purge gas that contains impurities can be released (purged) from the recycle gas path 3 into the air by temporarily opening the purging valve 9.

The upstream end of the discharge path 8 may be connected to the fuel gas supply path 2 between the confluence portion 4 and the gas inlet of the pressure booster 5. Accordingly, the purge gas that contains impurities can be released (purged) from the fuel gas supply path 2 into the air by temporarily opening the purging valve 9.

The upstream end of the discharge path 8 may be connected to the fuel gas supply path 2 between the gas outlet of the pressure booster 5 and the anode inlet 1A. Accordingly, the purge gas that contains impurities can be released (purged) from the fuel gas supply path 2 into the air by temporarily opening the purging valve 9.

In the fuel cell system 100 according to the present embodiment, the upstream end of the discharge path 8 is connected to the recycle gas path 3. Accordingly, when the purge gas that contains impurities is released (purged) from the recycle gas path 3 into the air by temporarily opening the purging valve 9, releasing of the fuel gas high in the concentration of the hydrogen can be suitably inhibited.

As described above, the fuel cell system 100 according to the present embodiment can reduce condensation of water vapor that occurs in the pressure booster 5 more than conventional systems.

Specifically, since the amount of saturated water vapor contained in a certain volume depends on temperature and is irrelevant to pressure, and the amount of water vapor contained per unit volume of the anode off-gas increases as the pressure rises in cases where the temperature is constant, the water vapor in the anode off-gas can possibly condense into water when the pressure booster 5 pressurizes the anode off-gas. In such a time, the anode off-gas higher in humidity accompanies a larger amount of water vapor in the anode off-gas and as a result, it is more likely that condensed water will be caused in the pressure booster 5.

Thus, in the fuel cell system 100 according to the present embodiment, the pressure booster 5 is arranged in the fuel gas supply path 2 between the confluence portion 4 and the anode inlet 1A, and the fuel gas with low humidity and the anode off-gas with high humidity before flowing into the pressure booster 5 are mixed in the confluence portion 4. Accordingly, the humidity of the mixed gas that flows into the pressure booster 5 can be lowered. Consequently, even when the mixed gas is pressurized in the pressure booster 5, condensation of water vapor in the pressure booster 5 can be reduced. As a result, possibilities of the flow rate of the mixed gas becoming unstable because of water clogging caused in a channel of the pressure booster 5 by the condensed water can be reduced. In addition, although there are possibilities that when the condensed water develops corrosion or contamination of the pressure booster 5, the pressure booster 5 can decrease in performance or go out of order, the fuel cell system 100 according to the present embodiment can reduce such possibilities.

Further, in the fuel cell system 100 according to embodiment, impurities mixed into the anode off-gas can be discharged outside by opening the purging valve 9 arranged in the discharge path 8 at an appropriate time. Accordingly, the concentration of the hydrogen in the anode off-gas can be suitably restored.

Second Embodiment

Figure 2:
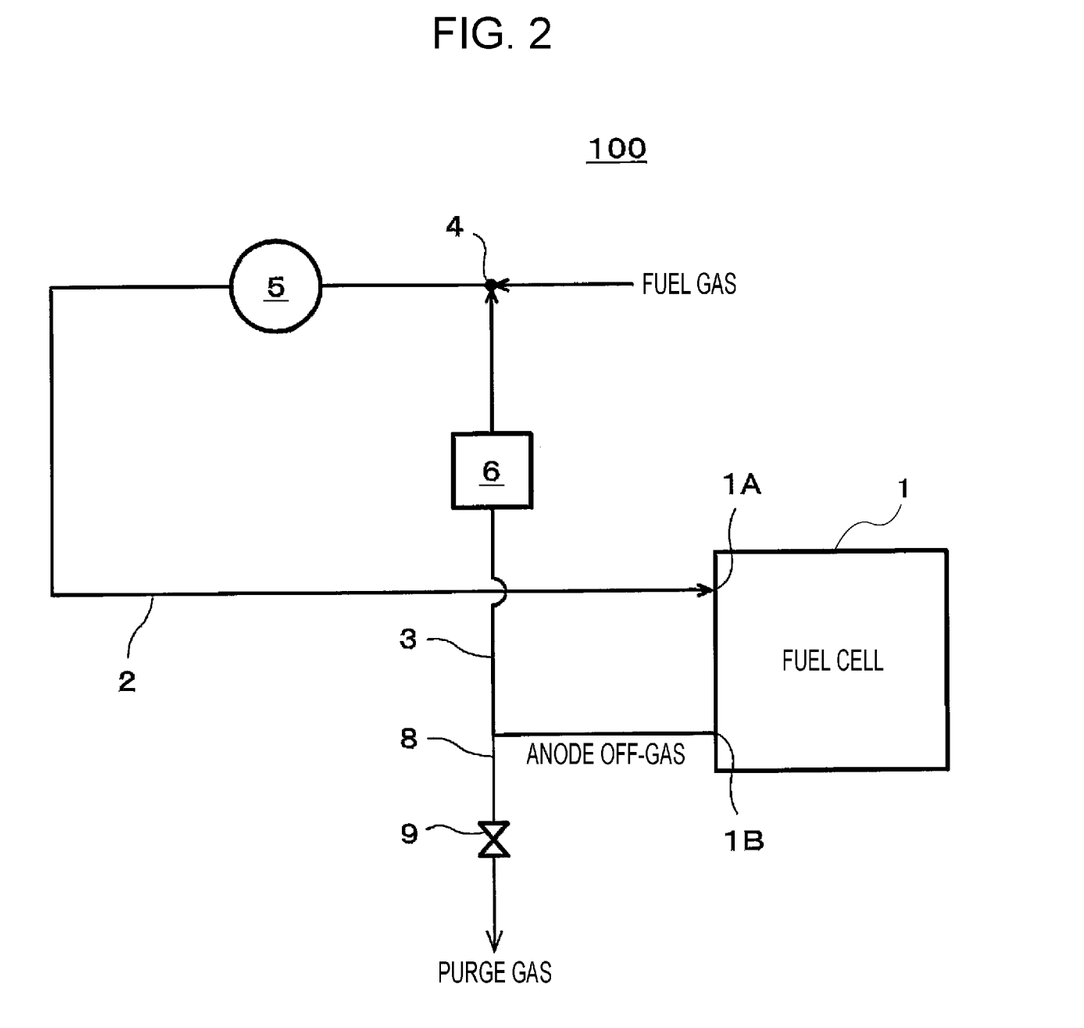
FIG. 2 illustrates an example of a fuel cell system according to a second embodiment.

FIG. 2 illustrates an example of a fuel cell system 100 according to a second embodiment.

In the example illustrated in FIG. 2, the fuel cell system 100 includes a fuel cell 1, a fuel gas supply path 2, a recycle gas path 3, a pressure booster 5, a flow rate regulator 6, a discharge path 8, and a purging valve 9.

Since the fuel cell 1, the fuel gas supply path 2, the recycle gas path 3, the pressure booster 5, the discharge path 8, and the purging valve 9 are similar to those in the first embodiment, descriptions thereof are omitted.

The fuel gas that flows into a confluence portion 4 tends to flow in a direction in which pressure loss of a channel is small and thus, when for example, pressure loss of the pressure booster 5 in the fuel gas supply path 2 is large, the fuel gas is hindered from flowing from the confluence portion 4 to the pressure booster 5 and flow of the fuel gas directed from the confluence portion 4 to an anode outlet 1B of the fuel cell 1 can possibly be caused. Then, when an upstream end of the discharge path 8 is connected to the recycle gas path 3, the fuel gas from the confluence portion 4 can possibly be discharged into the air through the discharge path 8.

Thus, the fuel cell system 100 according to the present embodiment includes the flow rate regulator 6 that regulates the flow rate of the anode off-gas.

The flow rate regulator 6 may have any configuration only when the configuration enables the flow rate of the anode off-gas to be regulated. The "regulation" as used herein includes raising or lowering the flow rate of the anode off-gas so that a suitable amount of anode off-gas flows in the recycle gas path 3 and stopping the flow of the anode off-gas in the recycle gas path 3.

As the flow rate regulator 6, for example, a flow rate regulating valve that regulates the flow rate of the anode off-gas can be used. For other examples, a check valve that disables flow of the fuel gas directed from the confluence portion 4 to the anode outlet 1B, a mechanism that increases pressure loss of the recycle gas path 3, and the like can be used as the flow rate regulator 6. Examples of the mechanism can include a narrowing mechanism that partially decreases the diameter of the pipe constituting the recycle gas path 3 and an orifice that is arranged in the pipe.

Thus, in the fuel cell system 100 according to the present embodiment, resistance to the flow of the fuel gas directed from the confluence portion 4 to the anode outlet 1B of the fuel cell 1 can be caused and accordingly, such flow of the fuel gas can be suitably regulated. Specifically, the flow rate of the anode off-gas directed to the confluence portion 4 can be regulated while flowing of the fuel gas reversely from the confluence portion 4 to the recycle gas path 3 can be inhibited. As a result, the fuel gas can be conveyed smoothly from the confluence portion 4 to the pressure booster 5.

The fuel cell system 100 according to the present embodiment may have a configuration similar to that of the fuel cell system 100 according to the first embodiment, except the above-described features.

Third Embodiment

Figure 3:
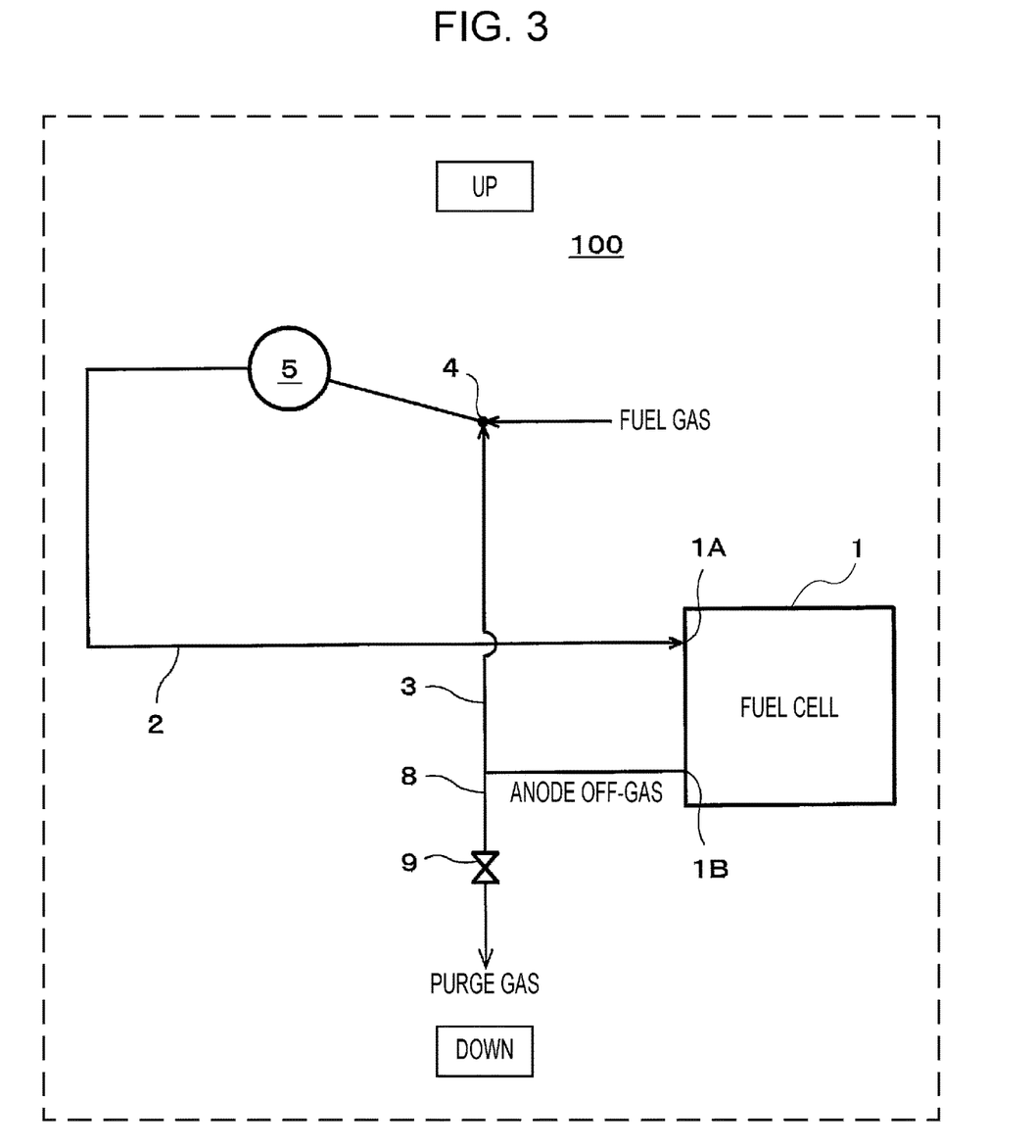
FIG. 3 illustrates an example of a fuel cell system according to a third embodiment.

FIG. 3 illustrates an example of a fuel cell system 100 according to a third embodiment. In FIG. 3, "UP" and "DOWN" are indicated and gravity acts downward from above, i.e. from a direction denoted as "UP".

In the example illustrated in FIG. 3, the fuel cell system 100 includes a fuel cell 1, a fuel gas supply path 2, a recycle gas path 3, a pressure booster 5, a discharge path 8, and a purging valve 9.

The fuel cell system 100 according to the present is similar to the fuel cell systems 100 according to the first embodiment, except the positional relationship in the up-and-down directions between a confluence portion 4 and the pressure booster 5.

The fuel cell 1 generates electric power and water vapor. Thus, anode off-gas can possibly be discharged from an anode outlet 1B of the fuel cell 1 in wet conditions. When the anode off-gas with high humidity passes through the recycle gas path 3, the temperature of the anode off-gas can possibly fall below the dew point with decrease in the temperature of the anode off-gas, which is caused by heat radiation of the anode off-gas through the recycle gas path 3. Further, when the high-temperature recycle gas and the low-temperature fuel gas meet each other in the confluence portion 4, the temperature of the anode off-gas can possibly fall below the dew point with decrease in the temperature of the anode off-gas. Moreover, when the operation of the fuel cell system 100 is stopped, the anode off-gas can possibly be cooled by heat radiation from a pipe. Consequently, water vapor in the anode off-gas can possibly condense into water. In this case, arranging the pressure booster 5 below the confluence portion 4 makes it easier for the condensed water caused as described above to flow into a gas inlet of the pressure booster 5 because of gravity.

Thus, in the fuel cell system 100 according to the present embodiment, the pressure booster 5 is arranged above the confluence portion 4. The definition "above" as used herein is based on cases where gravity acts downward from above. Accordingly, the fuel gas supply path 2 from the confluence portion 4 to the gas inlet of the pressure booster 5 can extend with an ascending gradient. Then, even when water vapor in the anode off-gas condenses into water, flowing of the condensed water into the gas inlet of the pressure booster 5 can be inhibited. As a result, possibilities of the flow rate of the mixed gas becoming unstable because of water clogging caused in a channel of the pressure booster 5 by the condensed water can be reduced. In addition, although there are possibilities that when the condensed water develops corrosion or contamination of the pressure booster 5, the pressure booster 5 can decrease in performance or go out of order, the fuel cell system 100 according to the present embodiment can reduce such possibilities. As in the example illustrated in FIG. 3, the confluence portion 4 may be arranged above the anode outlet 1B. Accordingly, the condensed water caused above the anode outlet 1B flows to the anode outlet 1B.

The fuel cell system 100 according to the present embodiment may have a configuration similar to those of the fuel cell systems 100 according to the first embodiment and the second embodiment, except the above-described features.

Fourth Embodiment

Figure 4:
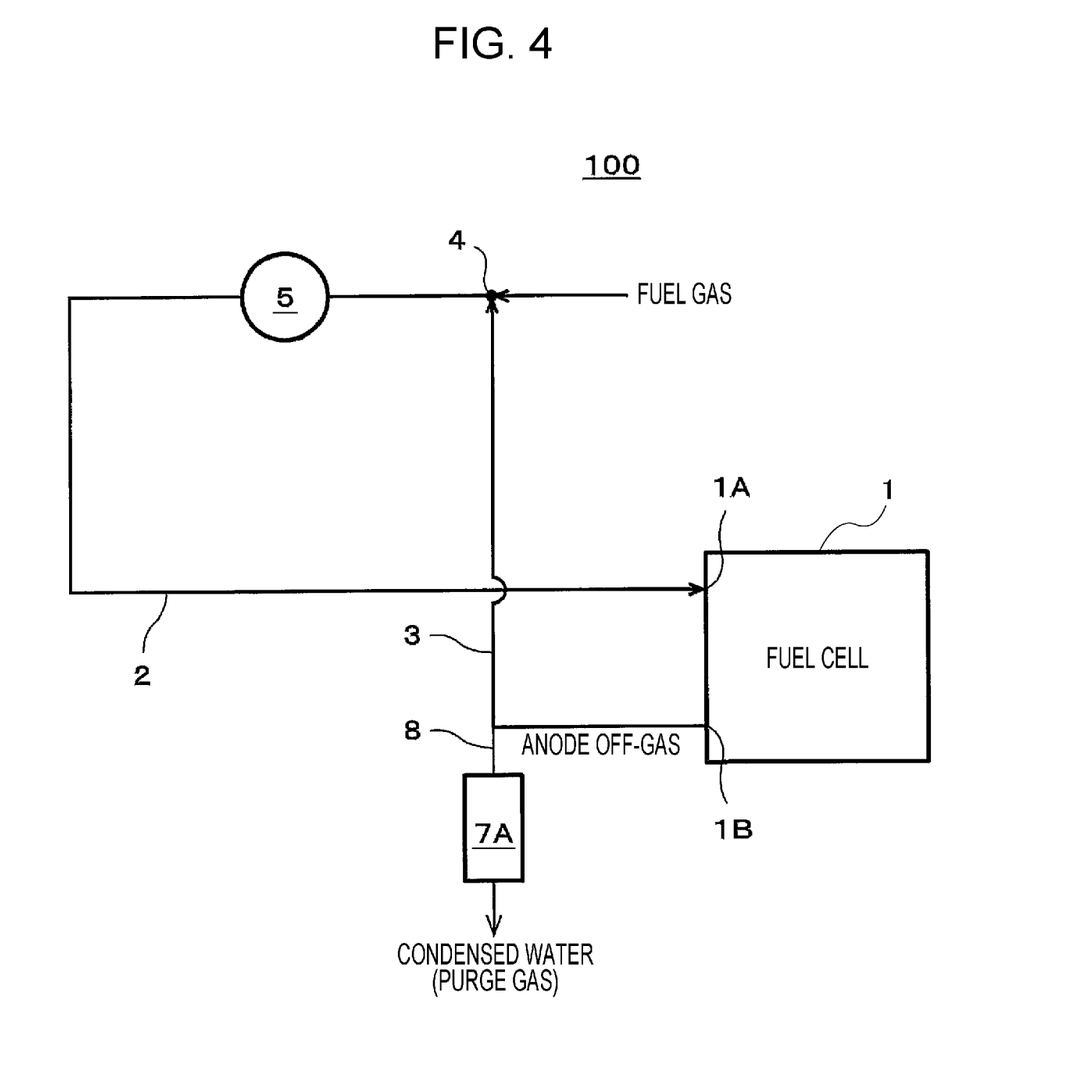
FIG. 4 illustrates an example of a fuel cell system according to a fourth embodiment.

FIG. 4 illustrates an example of a fuel cell system 100 according to a fourth embodiment.

In the example illustrated in FIG. 4, the fuel cell system 100 includes a fuel cell 1, a fuel gas supply path 2, a recycle gas path 3, a pressure booster 5, a gas liquid separator 7A, and a discharge path 8. Since the fuel cell 1, the fuel gas supply path 2, the recycle gas path 3, and the pressure booster 5 are similar to those in the first embodiment, descriptions thereof are omitted.

The fuel cell 1 generates electric power and water vapor. Thus, anode off-gas can possibly be discharged from an anode outlet 1B of the fuel cell 1 in wet conditions. When the anode off-gas with high humidity passes through the recycle gas path 3, the temperature of the anode off-gas can possibly fall below the dew point with decrease in the temperature of the anode off-gas, which is caused by heat radiation of the anode off-gas through the recycle gas path 3. Further, when the high-temperature recycle gas and the low-temperature fuel gas meet each other in a confluence portion 4, the temperature of the anode off-gas can possibly fall below the dew point with decrease in the temperature of the anode off-gas. Consequently, water vapor in the anode off-gas can possibly condense into water.

Thus, the fuel cell system 100 according to the present embodiment includes the gas liquid separator 7A that separates condensed water in the anode off-gas from the anode off-gas.

In the fuel cell system 100 according to the present embodiment, the gas liquid separator 7A is connected to the recycle gas path 3 through a branch path.

The gas liquid separator 7A may be, for example, a tank or a sealing valve arranged in the branch path that branches from the recycle gas path 3 between the anode outlet 1B of the fuel cell 1 and the confluence portion 4.

When the gas liquid separator 7A is the above-described tank, water sealing is given to the anode off-gas by for example, connecting the branch path to a lower end portion of the tank. When the tank is filled to near its brim with water, the water is discharged outside through an appropriate drain outlet in an upper portion of the tank.

When the gas liquid separator 7A is the above-described sealing valve, and when the branch path is filled to near its brim with water, the water is discharged outside by temporarily opening the sealing valve.

The branch path connected to the gas liquid separator 7A may be the discharge path 8 as illustrated in FIG. 4. In this case, the gas liquid separator 7A has the function of the purging valve 9. That is, through a drain outlet of the gas liquid separator 7A, condensed water is discharged while impurities mixed into the anode off-gas are discharged outside.

Thus, in the fuel cell system 100 according to the present embodiment, condensed water caused by decrease in the temperature of the anode off-gas with high humidity can be suitably treated in the gas liquid separator 7A. For example, even when condensed water is caused by decrease in the temperature of the anode off-gas discharged from the anode outlet 1B of the fuel cell 1, the gas liquid separator 7A can separate the condensed water from the anode off-gas. Accordingly, water clogging in the recycle gas path 3 caused by the condensed water can be inhibited. In addition, flowing of the condensed water into the anode outlet 1B and the pressure booster 5 can be inhibited.

The fuel cell system 100 according to the present embodiment may have a configuration similar to that of the fuel cell system 100 according to any one of the first embodiment to the third embodiment, except the above-described features.

First Variation

Figure 5:
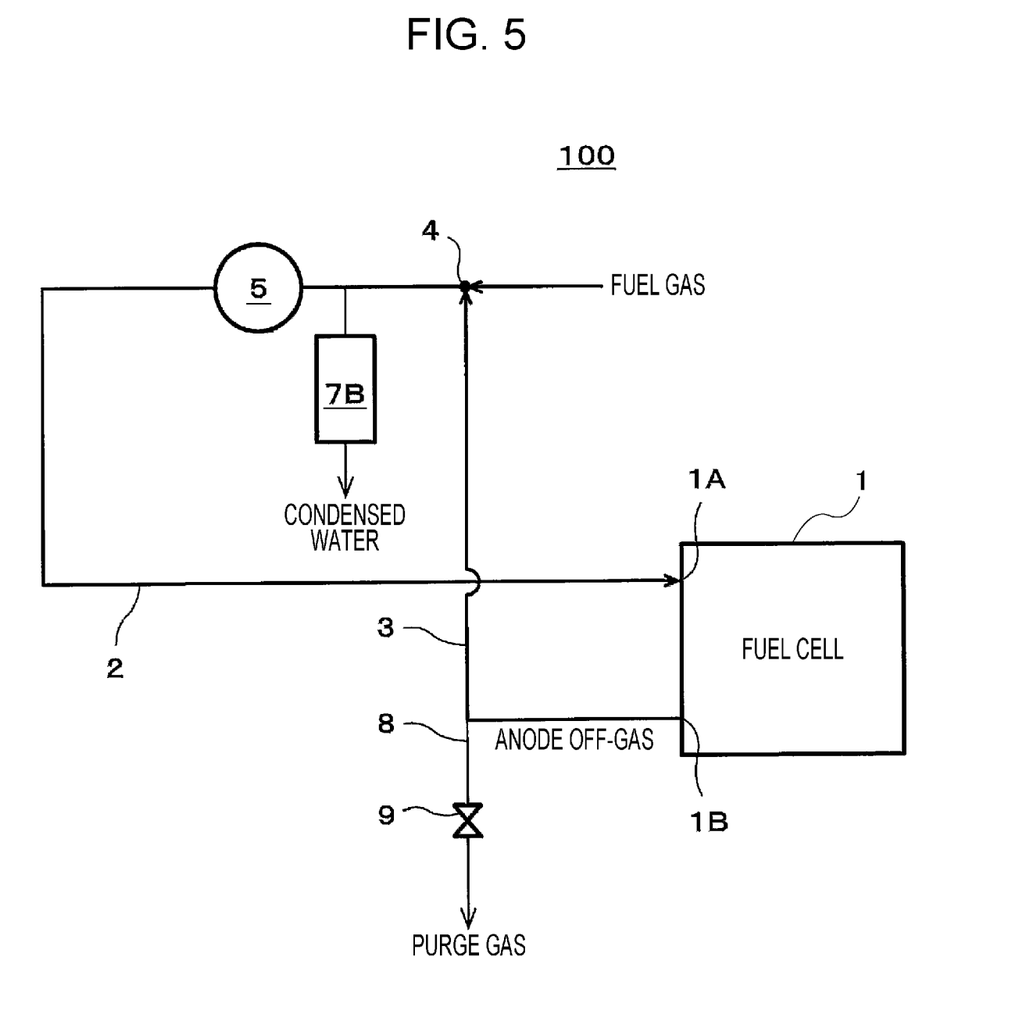
FIG. 5 illustrates an example of the fuel cell system according to a first variation of the fourth embodiment.

FIG. 5 illustrates an example of the fuel cell system 100 according to a first variation of the fourth embodiment.

In the example illustrated in FIG. 5, the fuel cell system 100 includes the fuel cell 1, the fuel gas supply path 2, the recycle gas path 3, the pressure booster 5, a gas liquid separator 7B, the discharge path 8, and the purging valve 9. Since the fuel cell 1, the fuel gas supply path 2, the recycle gas path 3, the pressure booster 5, the discharge path 8, and the purging valve 9 are similar to those in the first embodiment, descriptions thereof are omitted.

In the fuel cell system 100 according to the present variation, the gas liquid separator 7B is connected to the fuel gas supply path 2 between the confluence portion 4 and the gas inlet of the pressure booster 5 through the branch path.

The gas liquid separator 7B may be, for example, a tank or a sealing valve arranged in a branch path that branches from the fuel gas supply path 2 between the confluence portion 4 and the gas inlet of the pressure booster 5. Since the tank and the sealing valve are similar to those in the fourth embodiment, detailed descriptions thereof are omitted.

Thus, the fuel cell system 100 according to the present variation enables condensed water caused by decrease in the temperature of the mixed gas that contains the anode off-gas with high humidity and the fuel gas to be suitably treated. For example, even when condensed water is caused from the mixed gas (anode off-gas) by decrease in the temperature of the mixed gas, the gas liquid separator 7B can separate the condensed water from the mixed gas. Accordingly, water clogging in the fuel gas supply path 2 caused by the condensed water can be inhibited. In addition, flowing of the condensed water into the anode outlet 1B and the pressure booster 5 can be inhibited.

The fuel cell system 100 according to the present variation may have a configuration similar to that of the fuel cell system 100 according to any one of the first embodiment to the third embodiment, except the above-described features.

Second Variation

Figure 6:
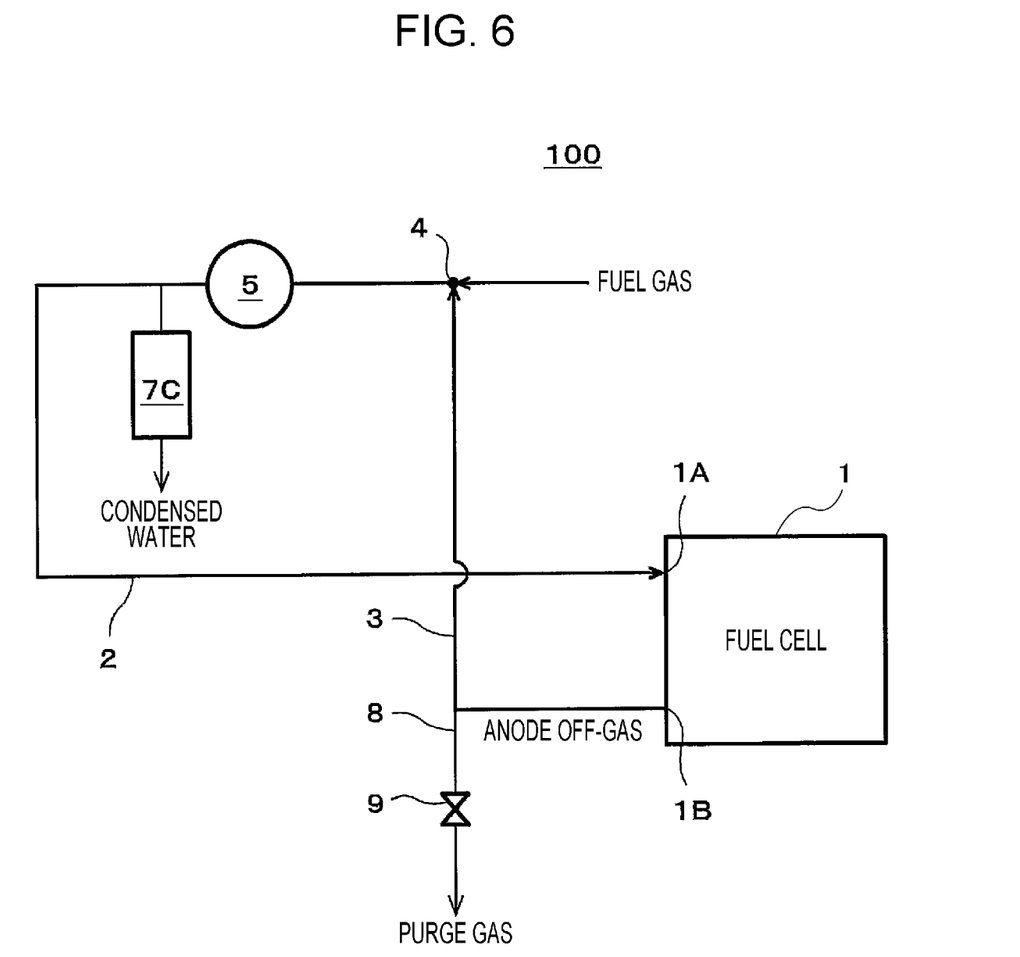
FIG. 6 illustrates an example of the fuel cell system according to a second variation of the fourth embodiment.

FIG. 6 illustrates an example of the fuel cell system 100 according to a second variation of the fourth embodiment.

In the example illustrated in FIG. 5, the fuel cell system 100 includes the fuel cell 1, the fuel gas supply path 2, the recycle gas path 3, the pressure booster 5, a gas liquid separator 7C, the discharge path 8, and the purging valve 9. Since the fuel cell 1, the fuel gas supply path 2, the recycle gas path 3, the pressure booster 5, the discharge path 8, and the purging valve 9 are similar to those in the first embodiment, descriptions thereof are omitted.

In the fuel cell system 100 according to the present variation, the gas liquid separator 7C is connected to the fuel gas supply path 2 between the gas outlet of the pressure booster 5 and an anode inlet 1A of the fuel cell 1 through a branch path.

The gas liquid separator 7C may be for example, a tank or a sealing valve arranged in the branch path that branches from the fuel gas supply path 2 between the gas outlet of the pressure booster 5 and the anode inlet 1A of the fuel cell 1. Since the tank and the sealing valve are similar to those in the fourth embodiment, detailed descriptions thereof are omitted.

Thus, the fuel cell system 100 according to the present variation enables condensed water caused by decrease in the temperature of the mixed gas that contains the anode off-gas with high humidity and the fuel gas and condensed water caused by the pressure of the mixed gas raised by the pressure booster 5 to be suitably treated. For example, even when condensed water is caused from the mixed gas (anode off-gas) by decrease in the temperature of the mixed gas, the gas liquid separator 7C can separate the condensed water from the mixed gas. Accordingly, water clogging in the fuel gas supply path 2 caused by the condensed water can be inhibited. In addition, flowing of the condensed water into the anode inlet 1A and the pressure booster 5 can be inhibited.

The fuel cell system 100 according to the present variation may have a configuration similar to that of the fuel cell system 100 according to any one of the first embodiment to the third embodiment, except the above-described features.

Although illustrated in none of FIGS. 1 through 6, units needed in the electric power generation of the fuel cell 1 are arranged as appropriate.

For example, in the fuel cell system 100, an oxidant gas supply unit that supplies oxidant gas to the cathode of the fuel cell 1.

In this case, the oxidant gas supply unit may have any configuration only when the configuration enables the oxidant gas to be supplied to the cathode. Examples of the oxidant gas supply unit can include an air blowing device, such as a blower or a fan.

When the supply source pressure of the supply source of the fuel gas is higher than the supply pressure needed for the fuel cell system 100, which is the supply pressure of the fuel gas, a governor or the like for lowering the pressure of the fuel gas to constant supply pressure may be arranged in the fuel gas supply path 2.

Further, a humidifier that humidifies the fuel gas may be arranged in the fuel gas supply path 2 between the pressure booster 5 and the anode inlet 1A. The humidifier may include a water tank or may include a heat exchanger.

The first through fourth embodiments and the first and second variations of the fourth embodiment may be combined with each other as long as the embodiments and variations do not preclude each other.

It is obvious from the descriptions above to persons skilled in the art that various modifications or other embodiments of the present disclosure may be made.

Thus, the descriptions above should be interpreted as mere examples, and are provided so as to teach the most desirable aspects for implementing the present disclosure to persons skilled in the art. The details of the structures and/or functions of the present disclosure may be substantially changed without departing from the spirit of the present disclosure.

An aspect of the present disclosure can reduce condensation of water vapor that occurs in a pressure booster more than in conventional systems and thus, can be utilized for fuel cell systems that are used in for example, household cogeneration systems or power supplies for electric vehicles.

What is claimed is:

1. A fuel cell system comprising:
a polymer electrolyte fuel cell that generates electric power using fuel gas including hydrogen gas and oxidant gas;
a fuel gas supply path through which the fuel gas is supplied to an anode inlet of the fuel cell;
a recycle gas path through which anode off-gas discharged from an anode outlet of the fuel cell returns to the fuel gas supply path;
a pressure booster that is arranged in the fuel gas supply path between a confluence portion and the anode inlet, the fuel gas supply path and the recycle gas path meeting each other in the confluence portion; and
a discharge path through which an impurity mixed into the anode off-gas is discharged outside, wherein the confluence portion is located in the fuel gas supply path and the confluence portion is upstream and separated from the pressure booster, and (1) the fuel gas flowing in the fuel gas supply path located upstream from the confluence portion and (2) the anode off-gas flowing in the recycle gas path are mixed with each other in the confluence portion.

2. The fuel cell system according to claim 1, further comprising a flow rate regulator that is arranged in the recycle gas path and regulates a flow rate of the anode off-gas.

3. The fuel cell system according to claim 1, wherein, in a direction of gravity, the pressure booster is arranged above the confluence portion.

4. The fuel cell system according to claim 1, further comprising a gas liquid separator that is connected to the recycle gas path or to the fuel gas supply path further downstream than the confluence portion.

5. The fuel cell system according to claim 4, wherein the gas liquid separator is connected to the fuel gas supply path downstream from the pressure booster.

6. The fuel cell system according to claim 4, wherein the gas liquid separator is connected to the fuel gas supply path upstream from the pressure booster.

7. The fuel cell system according to claim 1, wherein the fuel gas supply path is connected to a supply source of the fuel gas.

8. The fuel cell system according to claim 1, wherein the fuel gas has a lower humidity than the anode off-gas.

9. The fuel cell system according to claim 1, further comprising:

a flow rate regulator that is arranged in the recycle gas path and regulates a flow rate of the anode off-gas, wherein the flow rate regulator includes a flow rate regulating valve that regulates the flow rate of the anode off-gas, a narrowing mechanism that partially decreases a diameter of a pipe constituting the recycle gas path, or an orifice that is arranged in the pipe.

10. The fuel cell system according to claim 1, further comprising:

a gas liquid separator that separates condensed water in the anode off-gas from the anode off-gas, wherein the gas liquid separator is connected to the discharge path, through the gas liquid separator an impurities mixed into the anode off gas being discharged outside.

11. The fuel cell system according to claim 1, further comprising:

a gas liquid separator that is connected to the fuel gas supply path further downstream than the confluence portion.

* * * * *